United States Patent [19]
Chen

[11] Patent Number: 6,028,930
[45] Date of Patent: Feb. 22, 2000

[54] PORTABLE TELEPHONE HOLDER ASSEMBLY

[75] Inventor: Tonny Chen, Chang Hua, Taiwan

[73] Assignee: E. Lead Electronic Co., Ltd., Taiwan

[21] Appl. No.: 09/039,531

[22] Filed: Mar. 16, 1998

[51] Int. Cl.[7] .................................................. H04M 1/00
[52] U.S. Cl. ........................................ 379/446; 379/455
[58] Field of Search .................................. 379/446, 455, 379/454, 438; 455/90, 575

[56] References Cited

U.S. PATENT DOCUMENTS 5,202,913  4/1993  Lang et al. ............................... 379/419
5,507,446  4/1996  Ditzig ....................................... 379/438

*Primary Examiner*—Jack Chiang
*Attorney, Agent, or Firm*—Alan Kamrath; Oppenheimer, Wolff & Donnelly LLP

[57] ABSTRACT

A portable telephone holder assembly has a radio/recorder equipment and an electric module disposed in the radio/recorder equipment. The radio/recorder equipment has a front plate and at least an electric communication terminal socket. The electric module has a sound source select switch, a pre-amplifier, a power amplifier, a compact disk deck, a tape deck, a radio receiver, an antenna, a loudspeaker, a microphone, and the electric communication terminal socket.

4 Claims, 7 Drawing Sheets

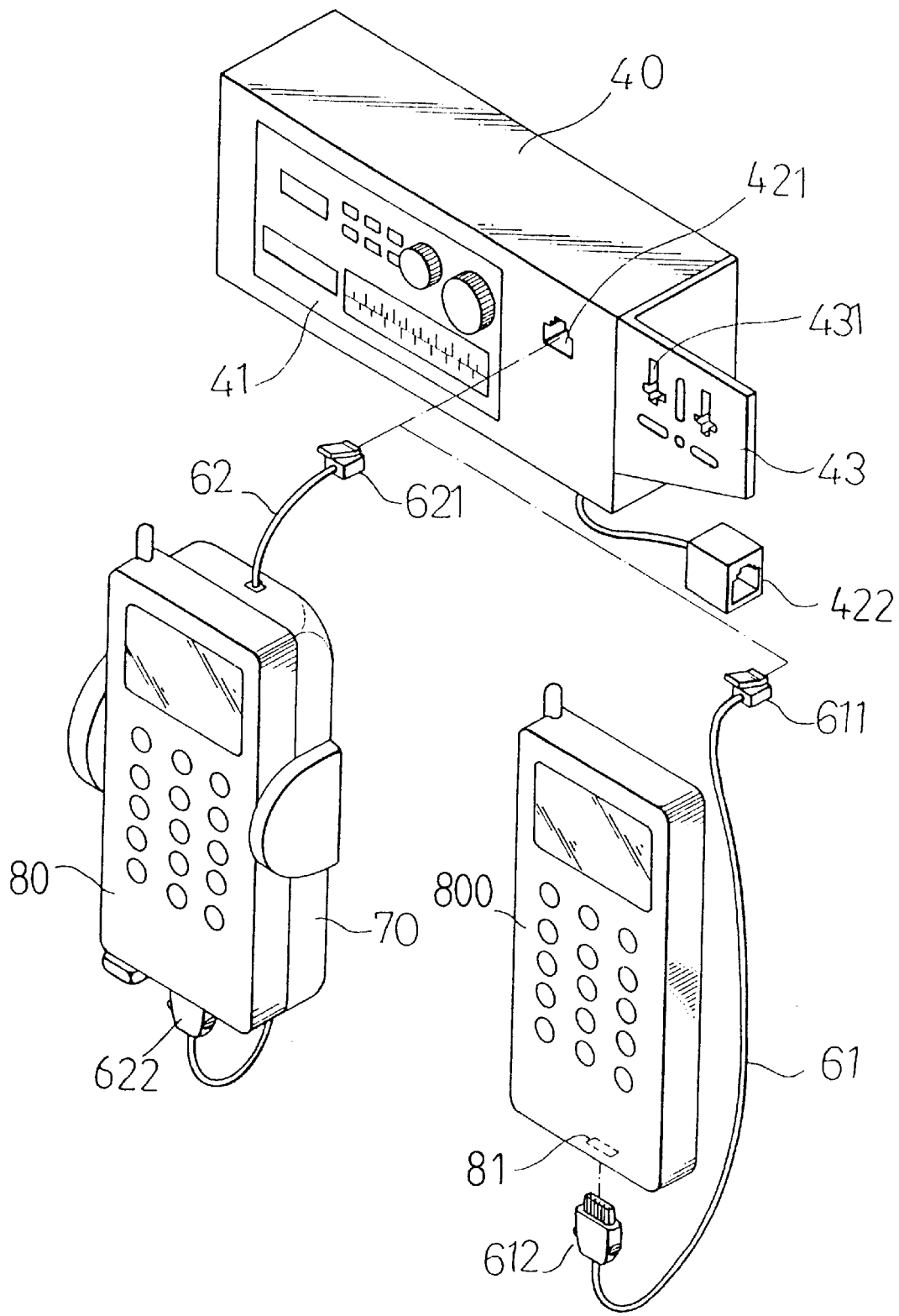
F I G. 3

PORTABLE TELEPHONE HOLDER ASSEMBLY

BACKGROUND OF THE INVENTION

The present invention relates to a portable telephone holder assembly. More particularly, the present invention relates to a portable telephone holder assembly which can utilize an electric communication terminal socket as an electric power source.

Referring to FIGS. 1 and 2, a conventional portable telephone holder assembly comprises a main electric circuit board 12', a portable telephone seat 11', a plug 13', a microphone 14', a loudspeaker 15', and an antenna 16'. The conventional portable telephone holder assembly is disposed in an interior 2' of a vehicle. A first wire 111' is connected to the portable telephone seat 11' and the main electric circuit board 12'. A second wire 131' is connected to the plug 13' and the main electric circuit board 12'. A third wire 141' is connected to the microphone 14' and the main electric circuit board 12'. A fourth wire 151' is connected to the loudspeaker 15' and the main electric circuit board 12'. A fifth wire 161' is connected to the antenna 16' and the main electric circuit board 12'. A portable telephone 80' is disposed in the portable telephone seat 11'. The wires 111', 131', 141', 151', and 161' may be tangled together. Since the main electric circuit board 12' should utilize the electric power source of the vehicle, the original design of the electric circuit of the vehicle should be modified. Therefore, the conventional portable telephone holder assembly is not very convenient for the user. The portable telephone seat 11' receives a portable telephone 80'.

SUMMARY OF THE INVENTION

An object of the present invention is to provide a portable telephone holder assembly which can utilize an electric communication terminal socket as an electric power source.

Another object of the present invention is to provide a portable telephone holder assembly which can utilize a plurality of electric communication terminal sockets connected to a plurality of portable telephones.

Accordingly, a portable telephone holder assembly comprises a radio/recorder equipment, and an electric module disposed in the radio/recorder equipment. The radio/recorder equipment comprises a front plate and at least an electric communication terminal socket. The electric module comprises a sound source select switch, a pre-amplifier, a power amplifier, a compact disk deck, a tape deck, a radio receiver, an antenna, a loudspeaker, a microphone, and the electric communication terminal socket. The electric communication terminal socket is connected to a portable telephone via a wire. An electric circuit of a portable telephone and the electric module are connected via the electric communication terminal socket. The antenna is connected to the radio receiver. The radio receiver is connected to the pre-amplifier. The tape deck is connected to the pre-amplifier. The compact disk deck is connected to the pre-amplifier. The microphone is connected to the electric circuit of the portable telephone. The sound source select switch is connected to the power amplifier. The power amplifier is connected to the loudspeaker. The pre-amplifier sends a signal to the sound source select switch via a pre-amplifier signal pathway. The electric circuit of the portable telephone sends an instruction to the sound source select switch via a first control line. The electric circuit of the portable telephone ouputs a sound to the sound source select switch via a sound output pathway. The electric circuit of the portable telephone turns off the tape deck and the compact disk deck via a second control line.

BRIEF DESCRIPTION OF THE DRAWINGS

FIG. 3 is a perspective exploded view of a radio/recorder equipment and a portable telephone holder assembly of a first preferred embodiment in accordance with the present invention;

DETAILED DESCRIPTION OF THE INVENTION

Figure 1:
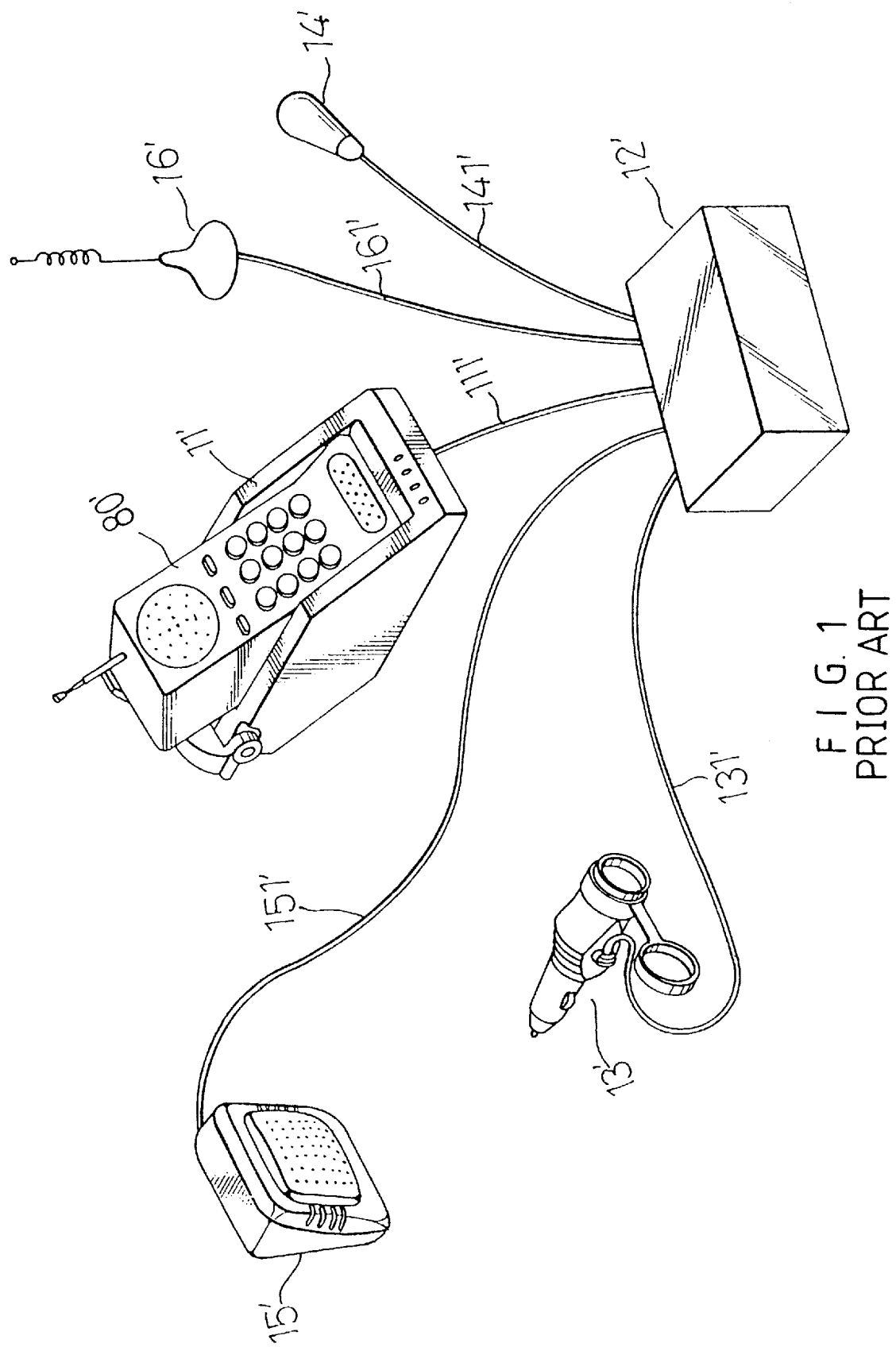
FIG. 1 is a perspective view of a conventional portable telephone holder assembly of the prior art.
Figure 2:
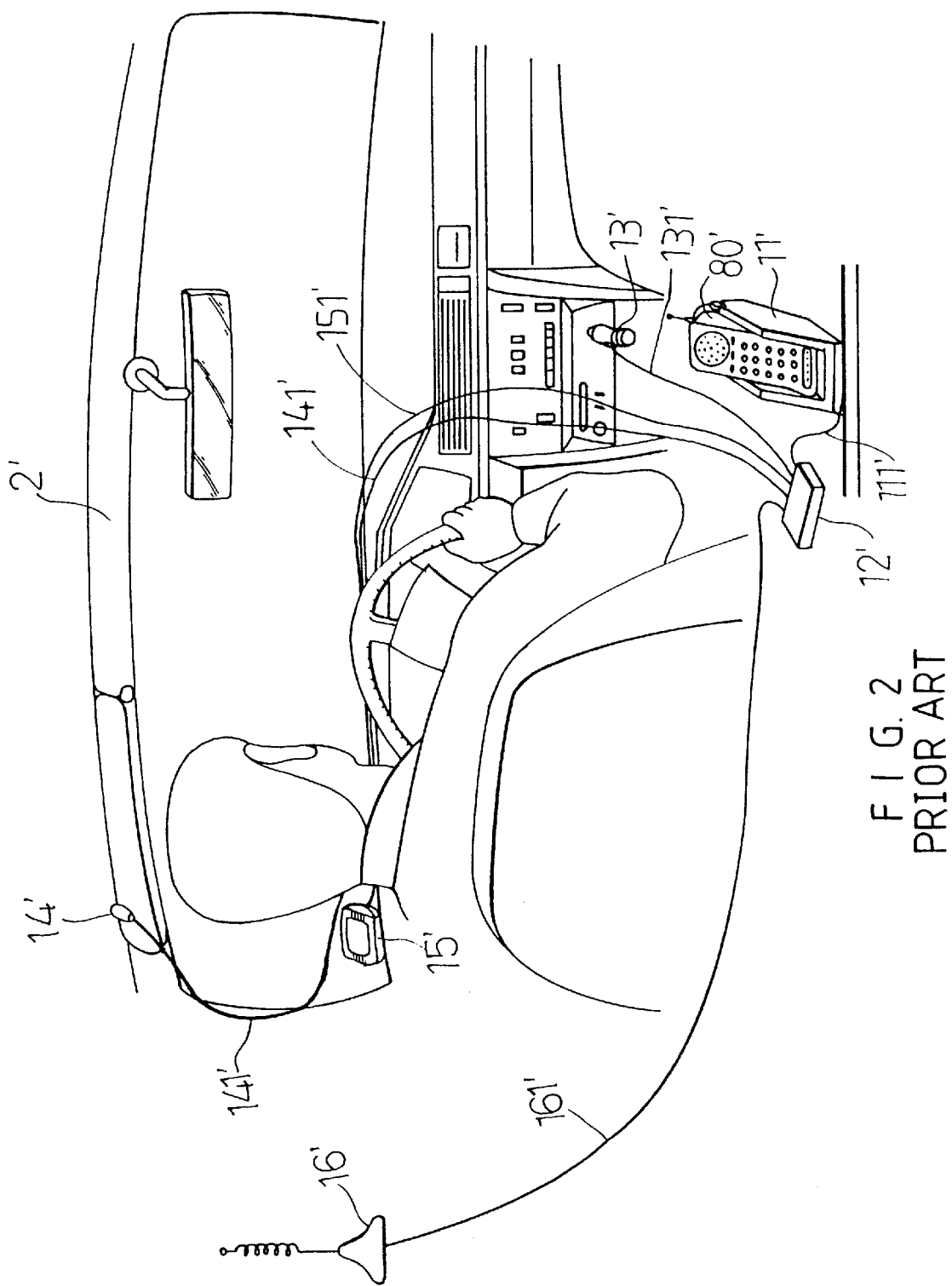
FIG. 2 is a perspective schematic view illustrating a conventional portable telephone holder assembly of the prior art installed in an interior of a vehicle.
Figure 4:
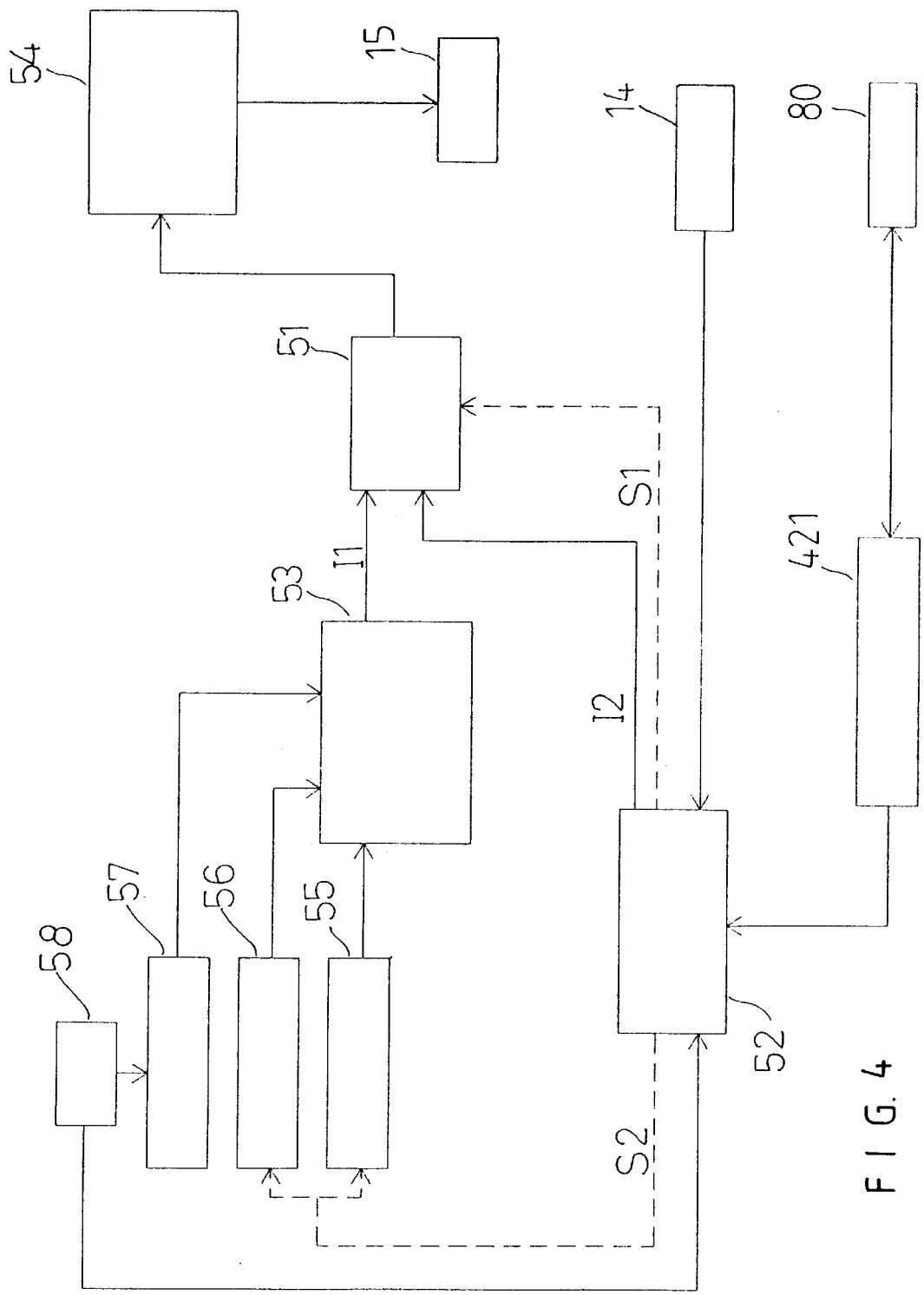
FIG. 4 is a block diagram of an electric module of a first preferred embodiment in accordance with the present invention.
Figure 5:
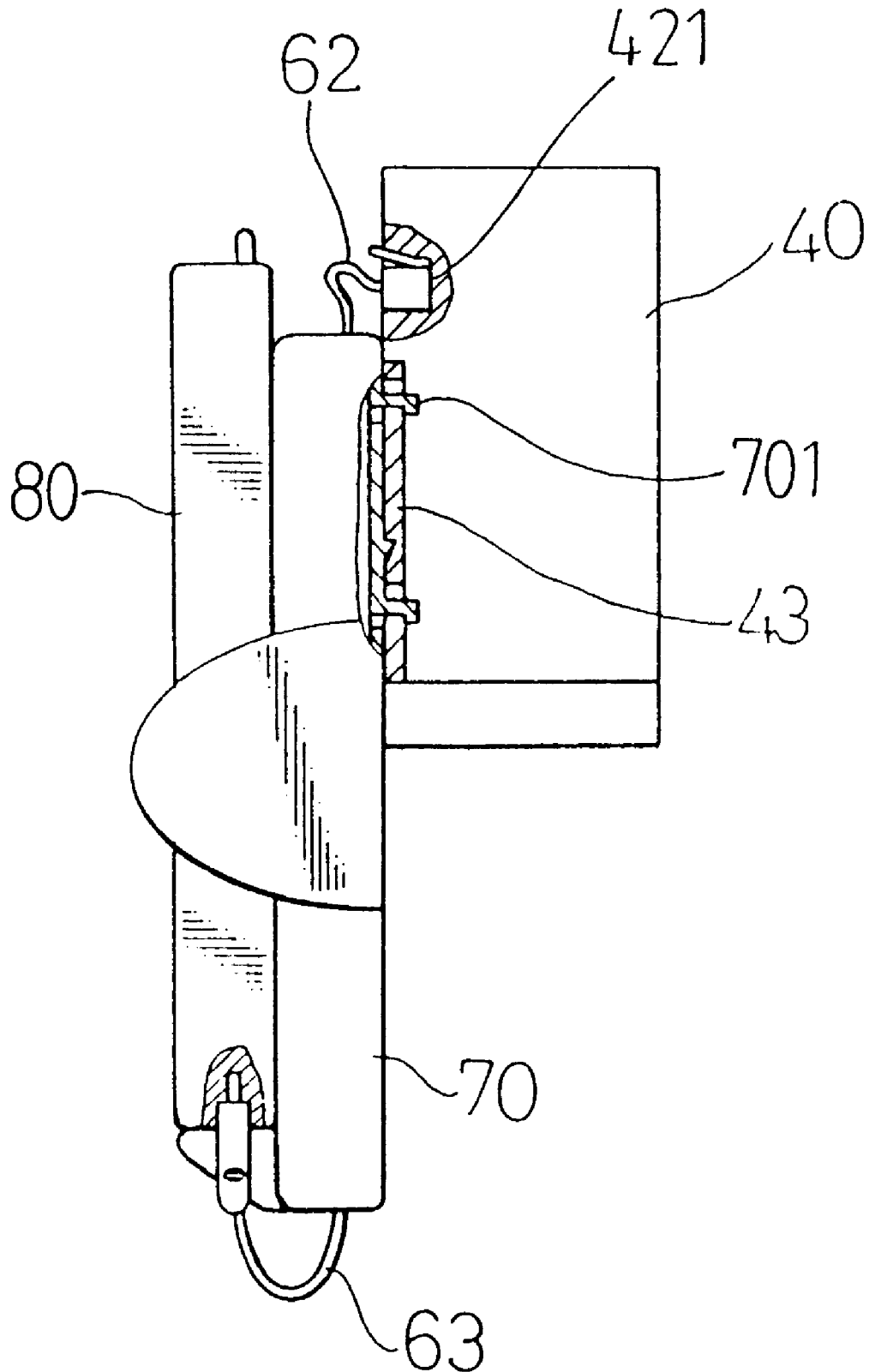
FIG. 5 is a schematic view illustrating an operation of a portable telephone holder assembly of a first preferred embodiment in accordance with the present invention.

Referring to FIGS. 3 to 5, a portable telephone holder assembly comprises a radio/recorder equipment 40, and an electric module 50 disposed in the radio/recorder equipment 40. The radio/recorder equipment 40 comprises a front plate 41, a lateral plate 43, a first socket 421, and a second socket 422. The lateral plate 43 has a plurality of holes 431.

The electric module 50 comprises a sound source select switch 51, a pre-amplifier 53, a power amplifier 54, a compact disk deck 55, a tape deck 56, a radio receiver 57, an antenna 58, a loudspeaker 15, a microphone 14, and the first socket 421.

The first socket 421 is an electric communication terminal socket connected to a portable telephone via a wire. An electric circuit 52 of a portable telephone and the electric module 50 are connected via the electric communication terminal socket 421.

The antenna 58 is connected to the radio receiver 57. The radio receiver 57 is connected to the pre-amplifier 53. The tape deck 56 is connected to the pre-amplifier 53. The compact disk deck 55 is connected to the pre-amplifier 53. The microphone 14 is connected to the electric circuit 52 of the portable telephone. The sound source select switch 51 is connected to the power amplifier 54. The power amplifier 54 is connected to the loudspeaker 15. The pre-amplifier 53 sends a signal to the sound source select switch 51 via a pre-amplifier signal pathway I1. The electric circuit 52 of the portable telephone sends an instruction to the sound source select switch 51 via a first control line S1. The electric circuit 52 of the portable telephone ouputs a sound to the sound source select switch 51 via a sound output pathway I2. The electric circuit 52 of the portable telephone turns off the tape deck 56 and the compact disk deck 55 via a second control line S2.

A first wire 62 has a first plug 621 inserted in the first socket 421, and a second plug 622 inserted in a first portable telephone 80. A portable telephone holder 70 receives the first portable telephone 80. A second wire 61 has a third plug 611 inserted in the second socket 422, and a fourth plug 612 inserted in a second portable telephone 800. The second portable telephone 800 has a jack 81 receiving the fourth plug 612. The portable telephone holder 70 has a rear post 701 inserted in one of the holes 431 of the lateral plate 43.

Figure 6:
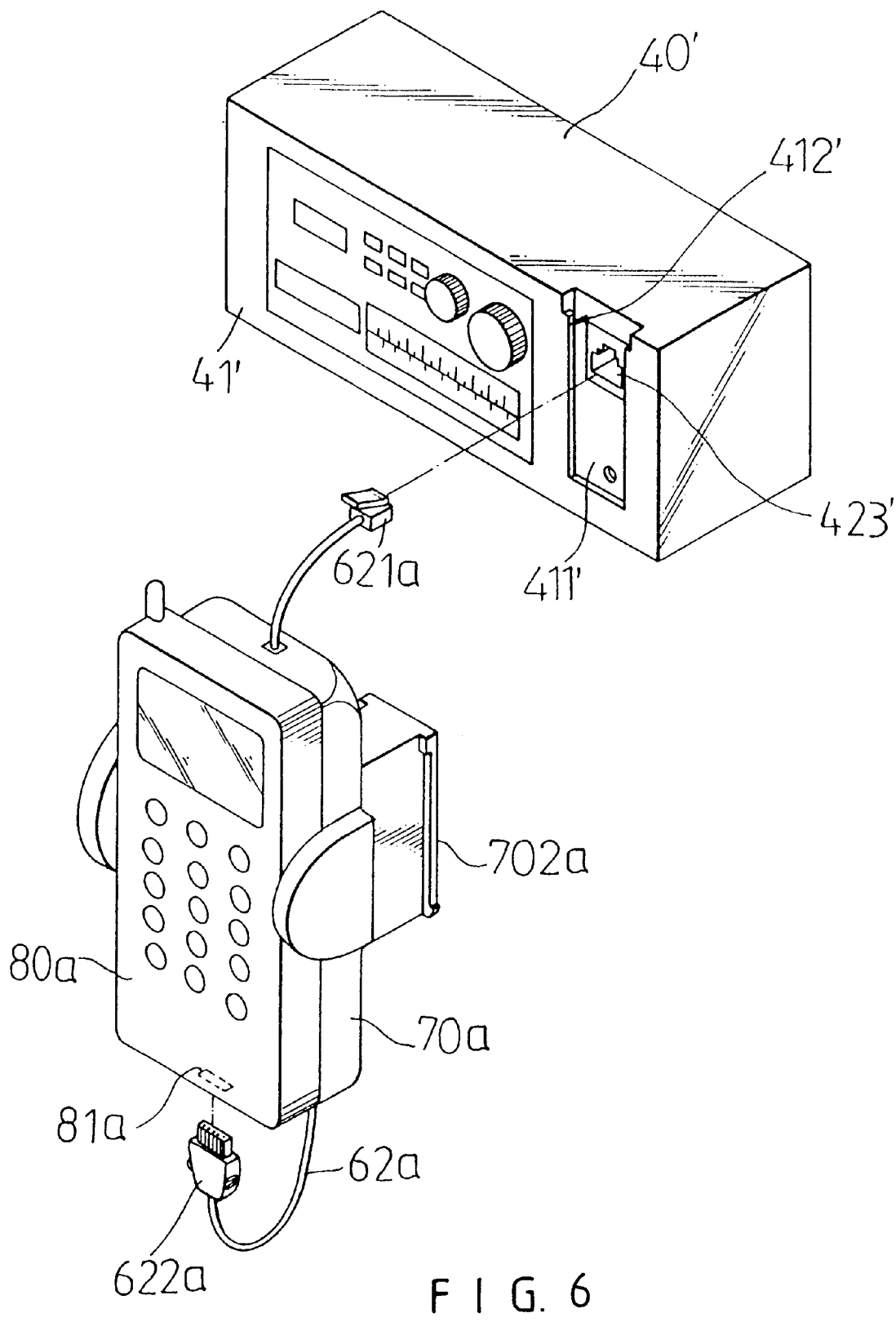
FIG. 6 is a perspective exploded view of a portable telephone holder assembly of a second preferred embodiment in accordance with the present invention.

Referring to FIG. 6, a second portable telephone holder assembly comprises a radio/recorder equipment 40', and an electric module 50 disposed in the radio/recorder equipment 40'. The radio/recorder equipment 40' comprises a front plate 41', a recess 411', an electric communication terminal socket 423', and a periphery groove 412'.

A portable telephone holder 70a receives a portable telephone 80a. A wire 62a has a first plug 621a inserted in the electric communication terminal socket 423', and a second plug 622a inserted in a jack 81a of the portable telephone 80a. The portable telephone holder 70a has a rear seat 702a inserted in the recess 411' via the periphery groove 412'.

Figure 7:
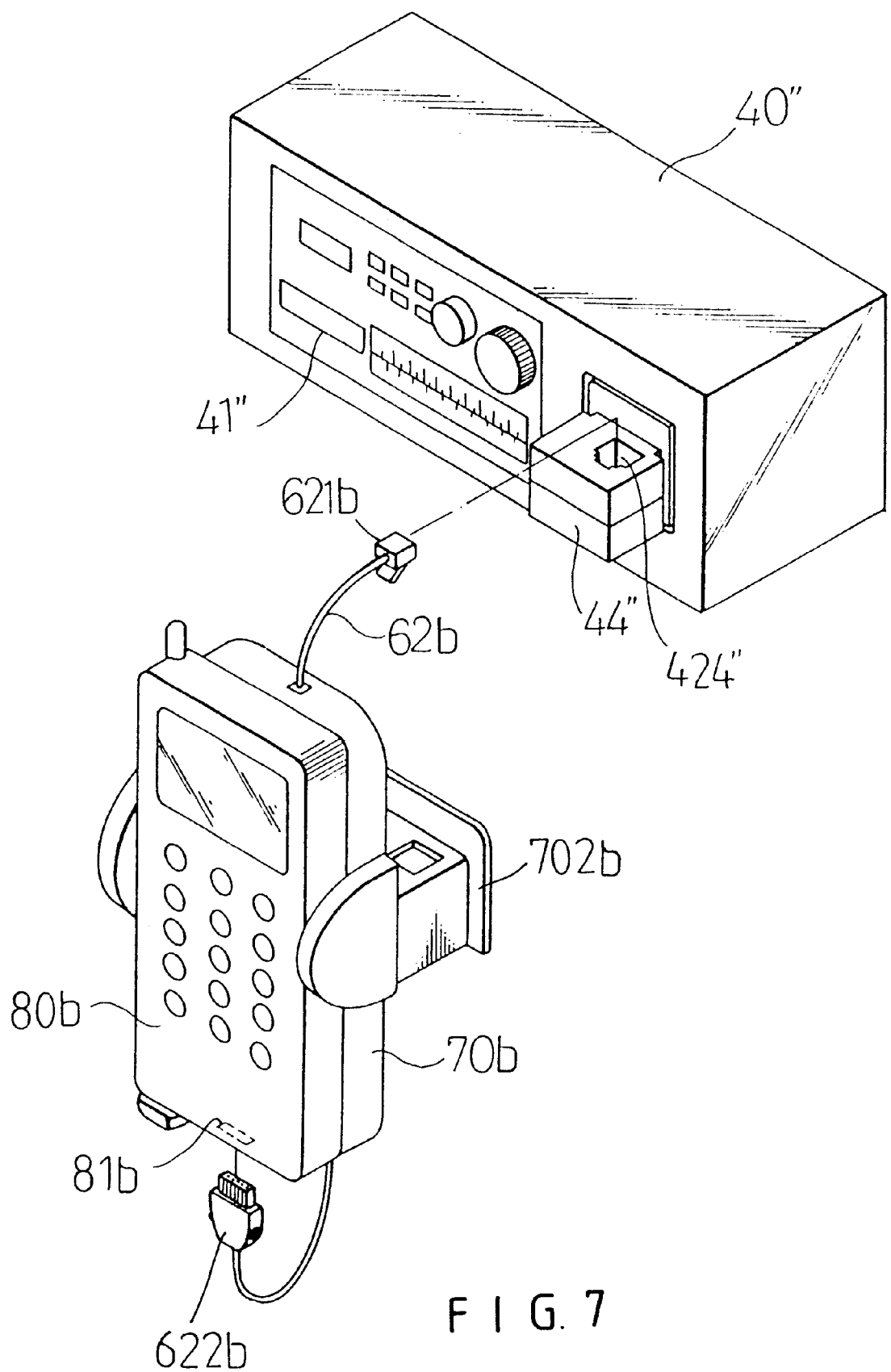
FIG. 7 is a perspective exploded view of a portable telephone holder assembly of a third preferred embodiment in accordance with the present invention.

Referring to FIG. 7, a third portable telephone holder assembly comprises a radio/recorder equipment 40", and an electric module 50 disposed in the radio/recorder equipment 40". The radio/recorder equipment 40" comprises a front plate 41", a protruded seat 44", and an electric communication terminal socket 424" formed on the protruded seat 44".

A portable telephone holder 70b receives a portable telephone 80b. A wire 62b has a first plug 621b inserted in the electric communication terminal socket 424" and a second plug 622b inserted in a jack 81b of the portable telephone 80b. The portable telephone holder 70a has a clamp device 702b engaged with the protruded seat 44".

The invention is not limited to the above embodiment but various modification thereof may be made. Further, various changes in form and detail may be made without departing from the scope of the invention.

I claim:

1. A portable telephone holder assembly comprises:

a radio/recorder equipment and an electric module disposed in the radio/recorder equipment, the radio/recorder equipment comprising a front plate and at least an electric communication terminal socket, the electric module comprising a sound source select switch, a pre-amplifier, a power amplifier, a compact disk deck, a tape deck, a radio receiver, an antenna, a loudspeaker, a microphone, and the electric communication terminal socket, the electric communication terminal socket connected to a portable telephone via a wire, an electric circuit of a portable telephone and the electric module connected via the electric communication terminal socket, the antenna connected to the radio receiver, the radio receiver connected to the pre-amplifier, the tape deck connected to the pre-amplifier, the compact disk deck connected to the pre-amplifier, the microphone connected to the electric circuit of the portable telephone, the sound source select switch connected to the power amplifier, the power amplifier connected to the loudspeaker, the pre-amplifier sending a signal to the sound source select switch via a pre-amplifier signal pathway, the electric circuit of the portable telephone sending an instruction to the sound source select switch via a first control line, the electric circuit of the portable telephone ouputting a sound to the sound source select switch via a sound output pathway, and the electric circuit of the portable telephone turning off the tape deck and the compact disk deck via a second control line.

2. A portable telephone holder assembly as claimed in claim 1, wherein the radio/recorder equipment has a a lateral plate which has a plurality of holes.

3. A portable telephone holder assembly as claimed in claim 1, wherein the radio/recorder equipment has a recess and a periphery groove.

4. A portable telephone holder assembly as claimed in claim 1, wherein the radio/recorder equipment has a protruded seat.

* * * * *